United States Patent
Caretta

(10) Patent No.: US 7,597,837 B2
(45) Date of Patent: *Oct. 6, 2009

(54) METHOD AND APPARATUS FOR MOULDING AND CURING TYRES FOR VEHICLE WHEELS

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 1570 days.

This patent is subject to a terminal disclaimer.

(21) Appl. No.: 10/025,787

(22) Filed: Dec. 26, 2001

(65) Prior Publication Data

US 2002/0053759 A1      May 9, 2002

Related U.S. Application Data

(63) Continuation of application No. PCT/EP00/05389, filed on Jun. 13, 2000.

(60) Provisional application No. 60/147,027, filed on Aug. 3, 1999.

(30) Foreign Application Priority Data

Jun. 25, 1999    (EP) .................................. 99830405

(51) Int. Cl.
*B29C 35/00* (2006.01)

(52) U.S. Cl. ...................... 264/501; 156/123; 264/326; 425/44; 425/49

(58) Field of Classification Search ................ 264/501, 264/326, 315; 425/44, 49; 156/110.1, 414, 156/123

See application file for complete search history.

(56) References Cited

U.S. PATENT DOCUMENTS

| 1,328,676 | A | | 1/1920 | Krannich | |
|---|---|---|---|---|---|
| 1,407,839 | A | * | 2/1922 | Clinefelter et al. | .......... 156/133 |
| 1,798,210 | A | | 3/1931 | Laursen | |
| 2,987,769 | A | | 6/1961 | Fröhlich | |

(Continued)

FOREIGN PATENT DOCUMENTS

DE            355909            7/1922

(Continued)

OTHER PUBLICATIONS

Abstract from esp@cenet database—EP 0,242,840 (corresponds to U.S. Patent No. 4,895,692).
Abstract from esp@cenet database—EP 0,976,534.

*Primary Examiner*—Mathieu D. Vargot
(74) *Attorney, Agent, or Firm*—Finnegan, Henderson, Farabow, Garrett & Dunner, L.L.P.

(57) ABSTRACT

A method of moulding and curing tires for vehicle wheels includes the steps of disposing a tire being processed on a toroidal support, enclosing the tire and the toroidal support inside a moulding cavity defined in a vulcanization mould, pressing the outer surface of the tire against the moulding cavity walls, and administering heat to the tire to cause molecular crosslinking of the tire. The pressing step includes the steps of compressing side portions of the tire between the moulding cavity walls and the outer surface of the toroidal support, concurrently with the closing step, and imposing an expansion to a radially-outer portion of the tire to bring the radially-outer portion of the tire against the walls of the moulding cavity.

13 Claims, 5 Drawing Sheets

U.S. PATENT DOCUMENTS

| | | | |
|---|---|---|---|
| 3,887,313 A | | 6/1975 | Jaedicke et al. |
| 4,400,342 A | * | 8/1983 | Logan ........................ 264/501 |
| 4,895,692 A | | 1/1990 | Laurent et al. |
| 6,087,016 A | * | 7/2000 | Feeney et al. ............... 428/454 |
| 6,332,999 B1 | * | 12/2001 | Caretta ....................... 264/501 |
| 6,479,008 B1 | * | 11/2002 | Caretta ....................... 264/501 |

FOREIGN PATENT DOCUMENTS

| | | |
|---|---|---|
| EP | 0 976 533 | 2/2000 |
| EP | 0 978 370 | 2/2000 |
| EP | 0976534 | 2/2000 |
| GB | 150373 | 9/1920 |

* cited by examiner

METHOD AND APPARATUS FOR MOULDING AND CURING TYRES FOR VEHICLE WHEELS

CROSS-REFERENCE TO RELATED APPLICATIONS

This application is a continuation application of International Application No. PCT/EP00/05389, filed Jun. 13, 2000, in the European Patent Office, the contents of which are relied upon and incorporated herein by reference; additionally, Applicant claims the right of priority under 35 U.S.C. § 119(a)-(d) based on patent application No. 99830405.9, filed Jun. 25, 1999, in the European Patent Office; further, Applicant claims the benefit under 35 U.S.C. § 119(e) based on prior-filed, copending provisional application No. 60/147,027, filed Aug. 3, 1999, in the U.S. Patent and Trademark Office.

BACKGROUND OF THE INVENTION

1. Field of the Invention

The present invention relates to a method of moulding and curing tires for vehicle wheels, comprising the following steps: disposing a tire being processed on a toroidal support the outer surface of which substantially mates an inner surface of the tire itself; closing the tire and the toroidal support inside a moulding cavity defined in a vulcanization mould, said moulding cavity having walls the shape of which matches that of an outer surface of the tire when vulcanization has been completed; pressing the tire by its outer surface against the moulding cavity walls; administering heat to the tire being processed to cause a molecular crosslinking of same.

The invention also relates to an apparatus for moulding and curing tires for vehicle wheels, comprising: a toroidal support arranged to engage a tire being processed, said toroidal support having an outer surface substantially mating an inner surface of the tire itself; a vulcanization mould arranged to receive the toroidal support carrying the tire being processed within a moulding cavity having a tire-holding space delimited between the outer surface of the toroidal support and walls of the moulding cavity itself mating an outer surface of the cured tire; pressing devices for pressing the outer surface of the tire against the inner wall of the mould; heating devices for transmitting heat to the tire enclosed in the moulding cavity.

2. Description of the Related Art

In a tire production cycle it is provided that, after a manufacturing process in which the different tire components are made and/or assembled, a moulding and curing process should be carried out for the purpose of stabilizing the tire structure to a given geometric conformation, generally characterized by a particular tread pattern.

To this aim, the tire is introduced into a vulcanization mould usually comprising a pair of cheeks adapted to be axially moved close to each other, which are arranged to operate on the tire bead and sidewalls, and at least one crown of circumferentially distributed sectors susceptible of being radially moved close to each other so as to operate at the tire tread band. In more detail, cheeks and sectors are mutually movable between an open condition, in which they are spaced apart from each other to enable loading, of the tires being processed, and a closed condition in which they define a moulding cavity the geometric conformation of which is the same as the outer surfaces of the tire to be obtained.

In one of the most widespread moulding methods it is provided that a vulcanization bladder of elastomer material filled with high-temperature and high-pressure steam and/or another fluid should be inflated at the inside of the tire enclosed in the moulding cavity. In this manner the tire is conveniently urged against the inner walls of the moulding cavity and stabilized to the geometric configuration imposed to it, following a molecular crosslinking to which the elastomer material of which it is made is subjected, due to heat transmitted by the fluid through the bladder and by the mould walls.

Also known are moulding methods in which, instead of an inflatable vulcanization bladder, a rigid toroidal support having the same configuration as the inner surface of the tire to be obtained is arranged within the tire.

Such a method is disclosed for example in the European Patent EP 242 840 in which a rigid toroidal support is employed for imposing an appropriate shape and definitive sizes to a tire enclosed in the mould. According to the above patent disclosure, the different coefficient of thermal expansion between the toroidal metal support and the raw elastomer material of which the tire is made is utilized for achieving an appropriate moulding pressure.

In conclusion, the assembly of the parts forming the mould and the toroidal support define a closed space in the moulding cavity which is exactly shaped like the whole geometric configuration of the tire. In this way, both the outer surfaces and the inner surfaces of the tire are maintained in contact with rigid portions of the moulding and curing apparatus. In other words, all parts of the apparatus that are intended for setting the final tire geometry are rigid parts, in contrast with the methods using an inflatable vulcanization bladder that, as known, constitutes a deformable portion of the mould.

It is the Applicant's perception that, at the present state of the art, both the methods using an inflatable vulcanization bladder and the methods using a rigid toroidal support during tire vulcanization have some problems.

With reference to the methods using an inflatable bladder, it is in fact to be noted that the bladder deformability can easily give rise to geometric and/or structural imperfections in the tire due to possible distortions suffered by the bladder itself, following an unbalanced expansion for example, and/or due to friction phenomena generated between the outer surfaces of the bladder and the inner surfaces of the green tire.

Since on the bladder itself also relies the task of locking the tire beads against the corresponding mould portions, the bladder deformability makes it difficult to reach sufficiently high pressures for bead locking. Thus, undesired misalignments of the beads relative to the geometric axis of the tire may occur, giving then rise to distortions of the whole tire structure. In addition, an insufficient pressure for bead locking may cause formation of flashes at the beads, due to leakage of the elastomer material between the bladder and the mould, above all at the starting instants of the vulcanization process.

The vulcanization bladder needs use of important amounts of steam since the whole inner volume of the bladder inflated in the mould cavity is to be filled up, and in addition it constitutes an obstacle to transmission of heat to the tire by steam itself.

On the other hand, use of a rigid toroidal support instead of the inflatable vulcanization bladder makes it necessary to carry out a very precise and difficult checking of the volumes of the material employed in manufacturing the tire.

In addition, it is presently impossible to impose an appropriate radial and/or circumferential expansion to the tire, for achieving desired preloading effects in the reinforcing structures employed in the tire manufacture, for example.

Furthermore, even with the aid of the rigid toroidal support, achievement of a correct and efficient heat transmission to the inside of the tire is rather difficult.

U.S. Pat. No. 1,798,210 discloses a curing method according to which a previously-manufactured green tire is fitted on a toroidal support made of vulcanized rubber, to be then closed in the moulding cavity defined in a vulcanization mould. The toroidal support is completely hollow and is such shaped and sized that it cooperates with the inner walls of the moulding cavity to carry out a hermetic seal at the inner circumferential edges of the tire. The toroidal support sizes however are smaller than the inner sizes of the green tire, so as to define a gap extending from one bead to the other between the outer surfaces of the toroidal support and the inner surfaces of the green tire. After carrying out the closure of the mould, hot water and/or another hot fluid under pressure is admitted to the toroidal support, which fluid reaches the above described gap through openings formed in the toroidal support for fulfilling all functions required for tire moulding and curing.

In this curing process, however, manufacturing of the tire directly on the toroidal support to be introduced into the vulcanisation mould together with the tire itself is neither provided nor allowed.

In addition, since the toroidal support necessarily has smaller sizes than the inner sizes of the tire, structural defects may easily arise, which result from an imperfect centering and/or uncontrolled movements or distortions to which the tire is submitted on its being closed in the moulding cavity.

The Applicant has perceived that important improvements may be achieved if admission of working fluid, for carrying out tire moulding and/or heat supply for vulcanization, takes place at the inside of a gap which is formed between the toroidal support and the green tire only following an expansion imposed to the tire by effect of pressure. A method and an apparatus conceived on the basis of this principle are the object of a European Patent Application No. 98830473.9 in the name of the same Applicant.

SUMMARY OF THE INVENTION

In accordance with the present invention, it has also been found that important improvements may be achieved as regards tire expansion, with advantageous effects in terms of qualitative features of the final product, if concurrently with the expansion imposed to the tire, the tire side portions included, by way of example, between the tire beads and the transition regions between the sidewalls and the tread band are firmly held between the inner walls of the moulding cavity and the outer surface of the toroidal support. In this way, the tire expansion effect and consequent stretching of the cords forming the carcass and belt structures, is advantageously concentrated on the radially outer region of the tire itself, close to the treat band.

In more detail, it is an object of the invention to provide a method of moulding and curing tires for vehicle wheels, characterized in that said pressing step comprises the following actions: compressing side portions of the tire, extending away from the inner circumferential edges thereof, between the walls of the moulding cavity and the outer surface of the toroidal support, concurrently with said closing step; imposing an expansion to a radially outer portion of the tire, delimited between said side portions, to bring said radially outer portion against the inner walls of the moulding cavity.

In particular, tire expansion is preferably provided to be carried out through a step of admitting a fluid under pressure to at least one fluid-diffusion interspace created between the outer surface of the toroidal support and the inner surface of the tire.

Advantageously, before admission of fluid under pressure the inner surface of the tire substantially adheres, over its whole extension, to the outer surface of the toroidal support, said diffusion interspace being created following tire expansion.

Admission of fluid under pressure is preferably carried out through feeding channels formed in the toroidal support and opening onto the outer surface of the latter.

Before said pressing step, it may be advantageously provided that a preforming step of the tire should be carried out by preliminary admission of a working fluid between said outer surface of the toroidal support and the inner surface or the tire, under a lower pressure than that of the pressurized fluid admitted during the pressing step.

Preferably, heat administration takes place by admission of a heating fluid to said diffusion interspace, said heating fluid comprising the same fluid under pressure as employed for carrying out the pressing step.

In more detail, fluid under pressure is introduced into an upper portion of the moulding cavity and guided along an inner surface of the toroidal support towards a lower portion of the cavity itself.

Concurrently with said introduction step, a step of drawing said fluid under pressure out of the lower portion of the moulding cavity is also preferably carried out, so as to create a pressurized fluid stream along the inner surface of the toroidal support and the diffusion interspace.

In accordance with a preferred embodiment, a rotational movement around a geometric axis of the toroidal support is imparted to the fluid under pressure introduced into the moulding cavity.

Preferably said diffusion interspace has an extension of between 3 mm and 14 mm, measured between the inner surface of the tire and the outer surface of the toroidal support at least at an equatorial plane of the tire itself.

It is also preferably provided that said expansion should involve an increase in the tire circumference included between 1% and 3.5% measured at an equatorial plane (X-X) of the tire itself.

Still in accordance with the present invention, the step of disposing the tire on the toroidal support is preferably carried out by directly manufacturing the tire on the toroidal support.

Advantageously, before the step of admitting fluid under pressure, treatment of the inner surface of the tire may be carried out for preventing permeation of the pressurized fluid through the elastomer material forming the green tire.

In more detail, a prevulcanized liner is directly formed on the toroidal support during a preliminary step of the tire manufacture, to prevent permeation of said pressurized fluid through the elastomer material forming the green tire.

It is a further object of the invention to provide an apparatus for moulding and curing tires for vehicle wheels, characterized in that, under said closed condition, said holding space has radially inner portions having shape and sizes substantially corresponding to the shape and sizes of side portions of the tire, extending away from inner circumferential edges of same, and a radially outer portion having radial dimensions greater than the radial dimensions of a radially outer portion of the tire extending between the side portions of the tire itself.

In more detail, said pressing devices comprise channels for feeding a fluid under pressure which are formed through the toroidal support and open into the outer surface of said support.

Advantageously, said holding space when the mould is closed has a volume greater than the volume taken up by the tire itself.

It is further preferably provided that said feeding channels should open into at least one interspace for diffusion of the fluid under pressure, defined in the radially outer portion of said holding space, between the outer surface of the toroidal support and the inner surface of the tire being processed.

Advantageously, the outer surface of the toroidal support has an extension lower than the extension of the inner surface of the vulcanized tire.

It is also preferably provided that said pressing devices should comprise at least one guide duct for said fluid under pressure extending along an inner surface of the toroidal support and terminating at said feeding channels.

In particular, said guide duct is delimited between the inner surface of the toroidal support and a filling structure fastened to the inside of the toroidal support itself.

Said filling structure preferably has an outer surface substantially extending parallelly of the inner surface of the toroidal support.

In more detail, the filling structure comprises an upper portion having an outer surface substantially parallel to the inner surface of the toroidal support, and a lower portion having a base surface with a slightly inclined orientation relative to a horizontal plane.

Said pressing device may also comprise circumferentially-distributed admission nozzles oriented towards an end of said guide duct.

Preferably, said admission nozzles are oriented towards an inlet end of said guide duct, disposed above an equatorial plane of the toroidal support.

In more detail, said nozzles have an inclined orientation relative to a direction radial to a geometric axis of the toroidal support.

In a preferential embodiment, at least a first and a second series of said feeding channels are provided, said channels being located at respectively opposite positions relative to an equatorial median plane of the toroidal support and oriented towards directions respectively converging away from a geometric axis of the toroidal support.

It is also preferably provided that said toroidal support should have at least one centering shank for engagement in a centering seating associated with the mould for fixing the positioning of the toroidal support and of the tire in the moulding cavity.

Advantageously, said centering shank extends along a geometric axis common to said toroidal support, to said tire being processed and to said moulding cavity.

Still in accordance with the present invention, said heating devices preferably comprise at least one duct to send a heating fluid to the feeding channels.

Advantageously, said heating fluid comprises the same fluid under pressure as admitted from the pressurized-fluid feeding devices.

It is also preferably provided that said toroidal support should have a structure elastically yielding in an axial direction, at least at regions corresponding to inner circumferential edges of the tire.

In more detail, said toroidal support preferably has a structure elastically yielding in an axial direction at regions corresponding to the side portions of the tire.

BRIEF DESCRIPTION OF THE DRAWINGS

Further features and advantages will become more apparent from a detailed description of a preferred, but non-exclusive, embodiment of a method and an apparatus for moulding and curing tires for vehicle wheels, in accordance with the present invention. This description will be set forth hereinafter with reference to the accompanying drawings, given by way of non-limiting example, in which.

DETAILED DESCRIPTION OF THE PREFERRED EMBODIMENTS

Figure 1:
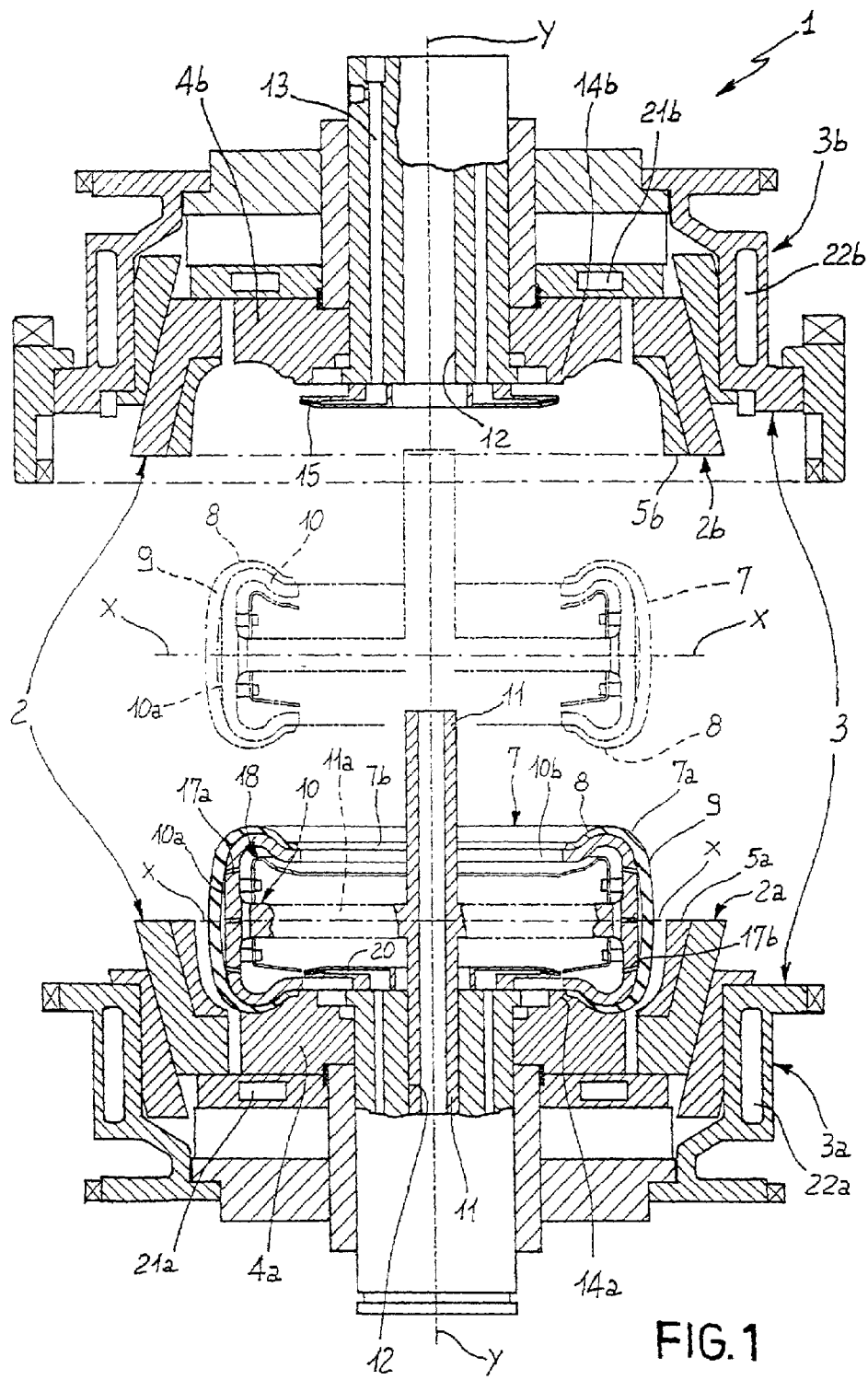
FIG. 1 diagrammatically shows a diametrical section of an apparatus in accordance with the invention with a mould arranged in an open condition to enable removal of a vulcanized tire.

With reference to said drawings, an apparatus for moulding and curing tires for vehicle wheels in accordance with the present invention has been generally identified by reference numeral 1.

Apparatus 1 comprises a vulcanization mould 2 associated with a vulcanisation press 3, only diagrammatically shown because it can be made in any manner convenient for a person skilled in the art. For instance, mould 2 may consist of a lower half 2a and an upper half 2b in engagement with a bedplate 3a and a closing portion 3b of press 3, respectively.

In the example, each of the lower 2a and upper 2b halves of mould 2 has a lower cheek 4a and an upper cheek 4b respectively, and a lower 5a and upper 5b crown of sectors.

Figure 2:
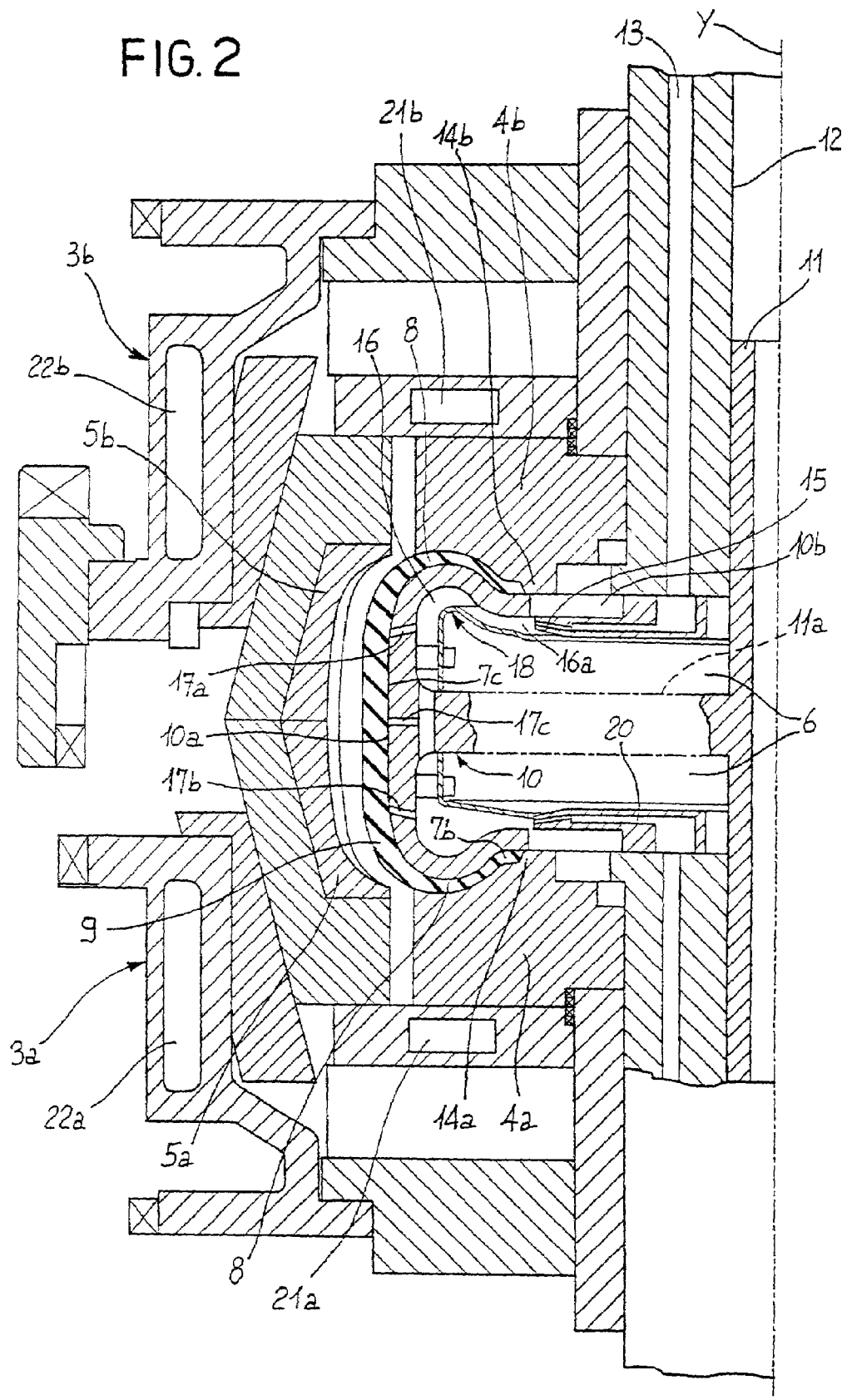
FIG. 2 is a fragmentary cross-section half, represented in an enlarged scale relative to FIG. 1, showing a green tire during an operating step in which mould closing has begun through movement of the cheeks close to the toroidal support.
Figure 3:
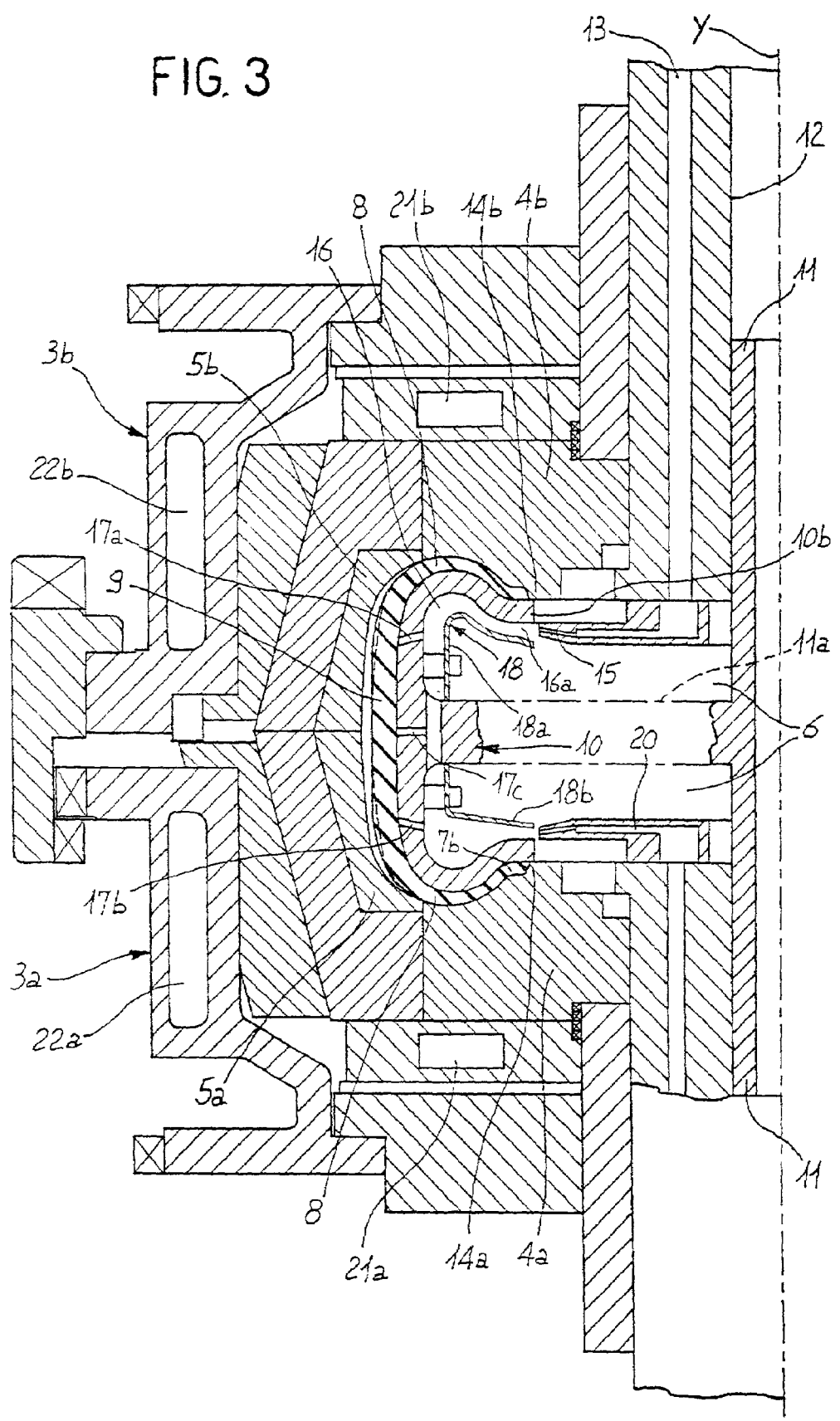
FIG. 3 is a cross-section half of the tire during an operating step in which, following radial approaching of the sectors, closure of the mould has been completed.
Figure 4:
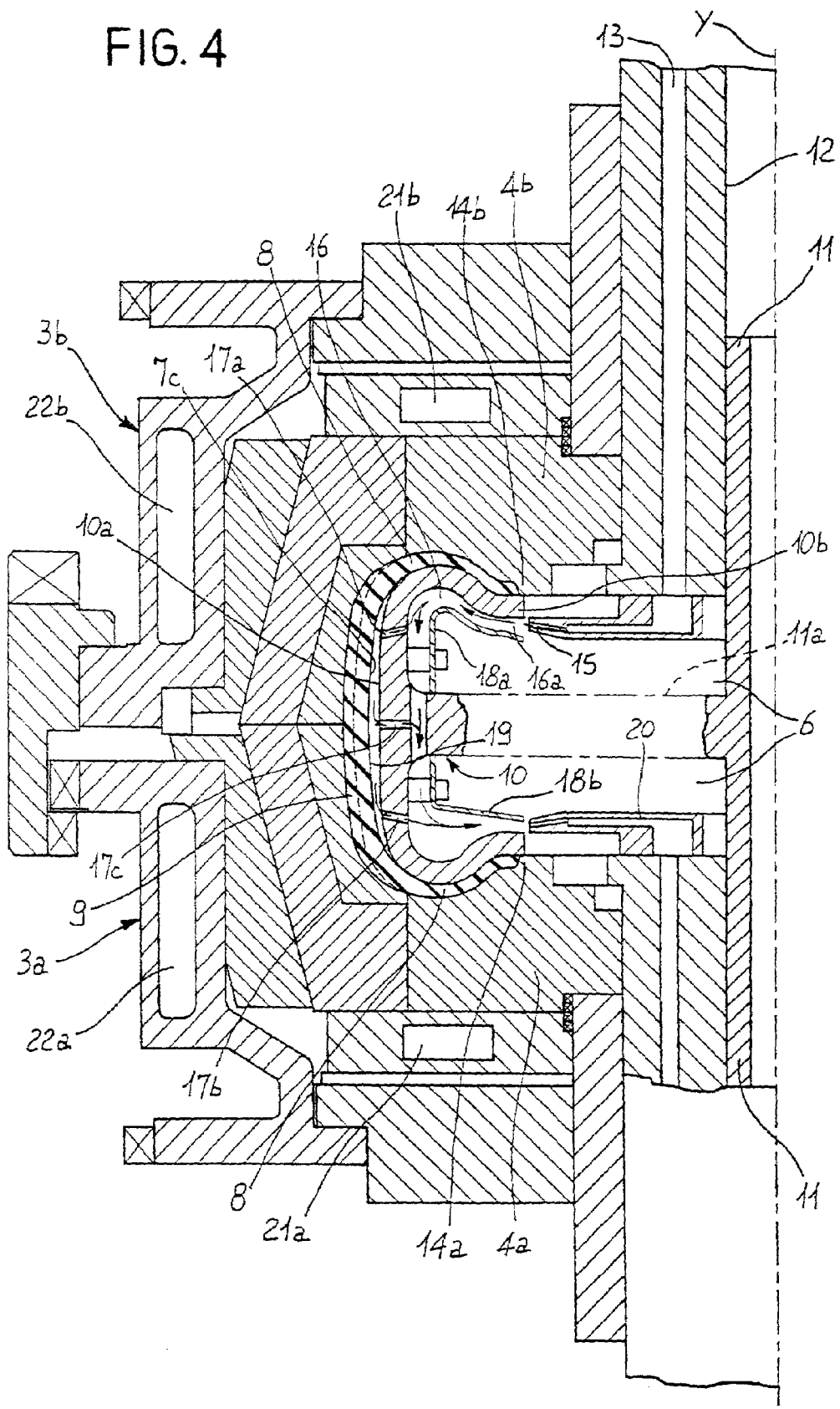
FIG. 4 is a cross-section half of the tire being moulded against the mould surfaces following admission of steam under pressure into the moulding cavity.

Lower 2a and upper 2b halves are mutually movable between an open condition in which they are mutually spaced apart as shown in FIG. 1, and a closed condition, shown in FIGS. 2 to 4, in which they are placed close to each other to form a moulding cavity 6 delimited by the inner walls of mould 2 defined by cheeks 4a, 4b and by sectors 5a, 5b. The inner walls of mould 2 have a shape matching the geometric conformation of outer surface 7a of a tire 7 to be obtained.

Tyre 7 usually has a carcass structure, preferably of the radial type, formed of one or more carcass plies having the respective opposite end edges in engagement with annular reinforcing structures incorporated into inner circumferential edges 7b of the tire itself, i.e. into the regions usually identified as "beads".

Two side portions 8 extending away from beads 7b and a radially outer portion 9 confined between said side portions can be identified in the carcass structure and, more generally, in the whole structure of tire 7.

Applied to the carcass structure, at radially outer portion 9 thereof, is a belt structure comprising one or more belt layers disposed successively and radially superposed on each other.

The carcass and belt structures, as well as the annular reinforcing structures at the beads, have not been shown in the accompanying drawings as they can be made in any convenient manner.

Cheeks 4a, 4b are intended for forming the outer surfaces of the opposite sidewalls of tire 7, extending a side portions 8, whereas sectors 5a, 5b are intended for acting at radially outer portion 9, to form the so-called tread band of the tire itself, by creating a series of cuts and longitudinal and/or transverse grooves (not shown in the drawings) therein, suitably disposed so as to form a desired "tread pattern".

Apparatus 1 further involves use of at least one toroidal support 10 of metal material or another solid material, having an outer surface 10a reproducing or at all events substantially matching the shape of an inner surface of tire 7 to be submitted to the moulding and curing treatment. Toroidal support 10 conveniently consists of a collapsible drum, i.e. a drum made up of centripetally movable circumferential segments so that the toroidal support itself can be disassembled and easily removed from tire 7 when the tire manufacture has been completed.

In accordance with the method of the invention, green tire 7 is disposed on toroidal support 10 before the latter is inserted, together with the tire itself, into vulcanization mould 2 arranged in an open condition.

In particular, engagement of tire 7 on toroidal support 10 can be conveniently obtained by manufacturing the tire directly on the support itself. In this way toroidal support 10 is advantageously utilized as a rigid model for formation and/or deposition of the different components, such as carcass plies, reinforcing structures at the beads, belt layers, sidewalls and tread band, cooperating in forming the tire itself. Further details about the modalities of forming and/or laying down components of tire 7 on toroidal support 10 can be found, for example, in the European Patent Applications issued under Nos. EP 0928680 and EP 0928702 respectively, in the name of the same Applicant.

Under this circumstance, the geometric conformation of the inner surface of green tire 7 will exactly correspond to, or at all events will substantially mate, the conformation of the outer surface of toroidal support 10. In other words, toroidal support 10 and tire 7 are in mutual contact relationship substantially in a homogeneous manner over the whole extension of their outer 10a and inner surfaces, respectively.

However, as better clarified in the following, the extension of outer surface 10a of toroidal support 10 is preferably provided to be conveniently lower than the extension of inner surface 7b of tire 7 when vulcanization has been completed.

Toroidal support 10 is preferably provided with at least one centering shank 11 for engagement in a centering seating 12 arranged in mould 2, for establishing a precise positioning of the toroidal support itself and of tire 7 carried by it within moulding cavity 6. In the embodiment shown, toroidal support 10 has two centering shanks 11 extending from opposite sides along a geometric axis Y common to toroidal support 10, to tire 7 and to moulding cavity 6, and arranged to be fitted into corresponding centering seatings 12 formed in bedplate 3a and closing portion 3b of vulcanization press 3, respectively.

Centering shanks 11 can be connected to toroidal support 10 by connecting linkages 11a (only diagrammatically shown) adapted to enable a centripetal movement of said circumferential segments forming the toroidal support itself.

After toroidal support 10 with tire 7 has been positioned on lower portion 2a of mould 2, the mould is brought to its closed condition.

As clearly shown in the accompanying drawings, following closure of mould 2 tire 7 is enclosed in a holding space confined between outer surface 10a of toroidal support 10 and the inner walls of moulding cavity 6.

Advantageously, this holding space when the mould is closed has a volume greater than the volume taken up by the tire itself. In more detail, as can be easily deduced from the accompanying figures, the holding space has two radially inner portions of shape and sizes substantially corresponding to the shape and sizes of side portions 8 of tire 7 and a radially outer portion confined between said radially inner portions, of radial dimensions greater than the radial dimensions, i.e. thickness, measured on radially outer portion 9 of the tire itself.

In a starting step of mould 2 closure, each of lower 4a and upper 4b cheeks is brought to act against the outer surfaces of tire 7 at one of side portions 8 of the tire itself, as clearly shown in FIG. 2.

Under this situation, each of side portions 8 of tire 7 is included between the walls of moulding cavity 6 corresponding to cheeks 4a, 4b and outer surface 10a of toroidal support 10.

Simultaneously, each of inner circumferential edges 7b of tire 7 is sealingly engaged between inner circumferential portions 10b of toroidal support 10 and inner annular portions 14a, 14b of lower 4a and upper 4b cheeks, usually called "bead rings". In more detail, between bead ring 14a, 14b of each cheek 4a, 4b and corresponding inner circumferential portion 10b of toroidal support 10, a housing seat for inner circumferential edge 7b of tire 7, usually known as tire "bead", is defined.

Said bead seats 14a, 14b give respective beads 7b a moulding of the greatest geometric accuracy and thickness, because it results from direct coupling between the rigid surfaces of toroidal support 10 and cheeks 4a, 4b of mould 2.

In addition, said bead seats ensure a very steady and precise centering of tire 7 relative to axis "Y" of moulding cavity 6.

Preferably, toroidal support 10 is also such sized that at least at the regions corresponding to beads 7b of tire 7 it has a structure elastically yielding in an axial direction, following mutual approaching of cheeks 4a, 4b during the closing step of mould 2.

In particular, toroidal support 10 is conveniently elastically yielding in an axial direction at the regions corresponding to the whole extension of tire side portions 8 submitted to a compression action between cheeks 4a, 4b and the toroidal support itself.

In more detail, the axial deformation to which toroidal support 10 is submitted at the contact regions with cheeks 4a, 4b close to tire beads 7b is preferably included between 0.3 and 0.5 mm, and is of such an extent that it generates a specific pressure included between 18 and 25 bar on the contact surfaces with corresponding cheeks 4a, 4b. This contact pressure, during the starting moulding and curing steps of tire, prevents any leakage of the elastomer material between the surfaces mutually in contact of toroidal support 10 and of cheeks 4a, 4b, thereby avoiding formations of consequent flashes. Following mutual approaching of cheeks 4a, 4b or concurrently with approaching of the same, closing of mould 2 is completed through radial approaching of sectors 5a, 5b while they move close to toroidal support 10.

As can be seen in FIG. 3, at the moment that closure of mould 2 is completed the walls of moulding cavity 6 close to sectors 5a, 5b keep to some distance from the outer surface of tire 7, whereas the inner surface of the tire adheres to outer surface 10a of toroidal support 10 substantially over the whole extension thereof.

In this step, the tread band disposed at radially outer portion 9 of tire 7 can at all events be partly penetrated by ridges arranged on sectors 5a, 5b, particularly close to the so-called tire "shoulders", i.e. at the transition regions between the tire sidewalls and tread band.

The pressing action of tire 7 against the inner walls of moulding cavity 6, the beginning of which took place with compression of side portions 8 between cheeks 4a, 4b and toroidal support 10, is carried out also at radially outer portion 9 of tire 7, concurrently with heat administration to cause molecular crosslinking of the elastomer material of which the tire is made and consequent geometric and structural stabilization of the tire itself.

To this purpose, apparatus 1 is provided with pressing devices comprising at least one primary duct 13 for feeding fluid under pressure, formed for example in closing portion 3b of press 3 and opening into moulding cavity 6 to send a fluid under pressure into said cavity, at a radially inner position relative to toroidal support 10.

A plurality of channels 17a, 17b, 17c for feeding fluid under pressure extends through toroidal support 10, these channels opening onto outer surface 10a of the toroidal support and being conveniently distributed on the circumferential extension of same.

In more detail, at least a first and a second series of feeding channels 17a, 17b are preferably provided, said series being disposed at respectively opposite positions relative to equatorial median plane X-X of toroidal support 10 and oriented in respectively converging directions away from geometric axis Y, for the purposes better clarified in the following. At least a third series of feeding channels 17c circumferentially distributed in median equatorial plane X-X may also be provided.

Figure 5:
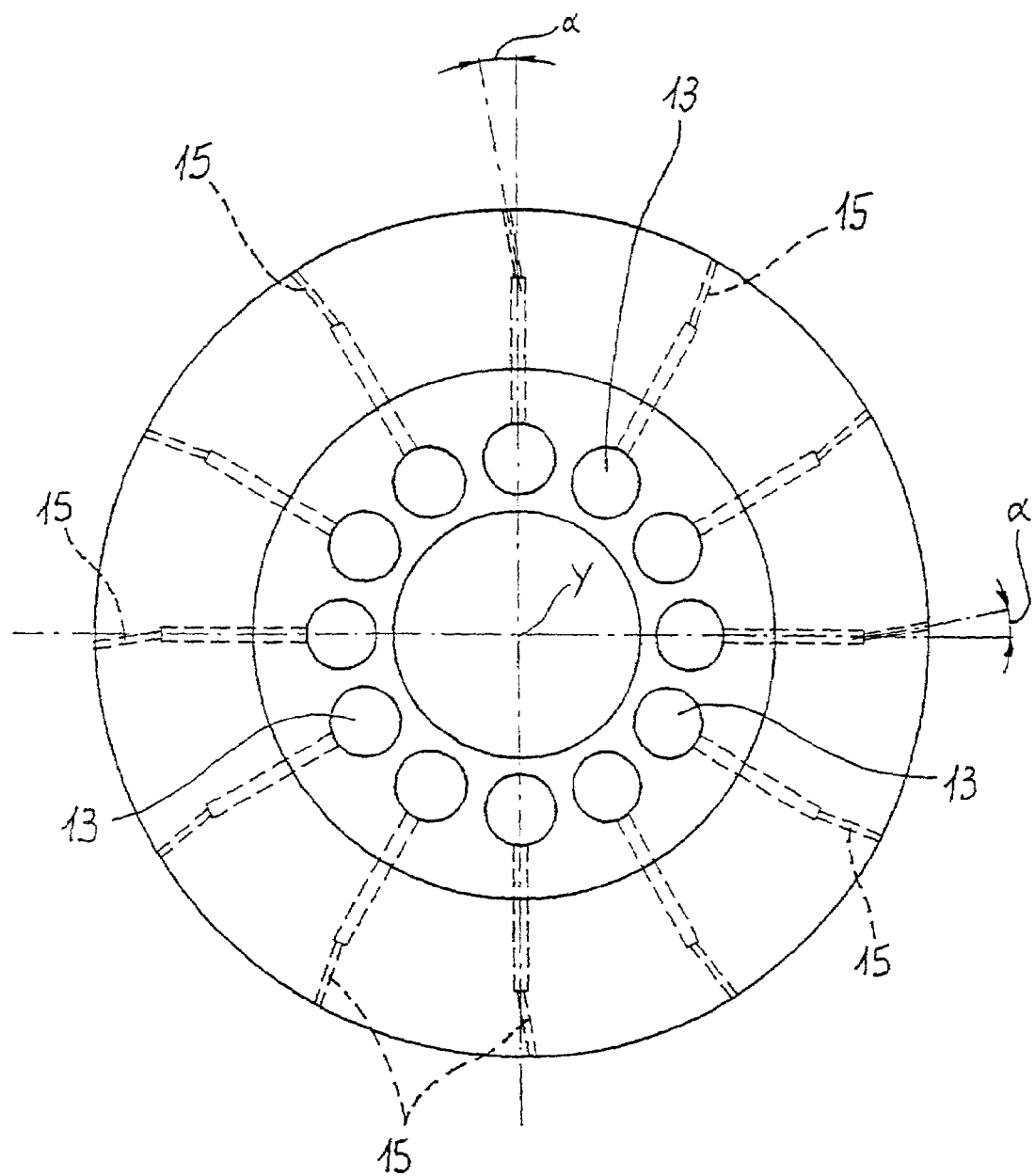
FIG. 5 is a diagrammatic plan view showing distribution of the working-fluid admission nozzles relative to the geometric axis of the mould and of the toroidal support.

The pressurized fluid fed from primary duct 13 is sent to moulding chamber 6 through a plurality of circumferentially distributed admission nozzles 15. As clearly illustrated in FIG. 5, these admission nozzles can advantageously have an inclined orientation, preferably at an angle α included between 15° and 45°, relative to a direction radial to geometric axis Y of moulding cavity 6, to give the working fluid under pressure a rotation movement around the geometric axis itself.

In addition, admission nozzles 15 disposed at the upper portion of moulding cavity 6 are advantageously provided to be directed towards inlet end 16a of a guide duct 16 extending along the inner surface of toroidal support 10 and connected to feeding channels 17. This guide duct 16 is advantageously confined between the inner surface of toroidal support 10 and a filling structure 18, preferably made of sheet metal and fastened to the inside of the toroidal support. As clearly shown in the drawings, filling structure 18 has an outer surface extending substantially parallel to the inner surface of toroidal support 10. In particular, filling structure 18 has an upper portion 18a having an outer surface parallel to the inner surface of toroidal support 10 and a lower portion 18b having a base surface slightly inclined relative to a horizontal plane, which extends between the radially outer and radially inner ends of the filling structure itself following a descending direction towards geometric axis Y. Due to the presence of this base surface, storage of condensate within filling structure 18 is advantageously avoided.

The pressurized fluid distributed from admission nozzles 15 runs through guide duct 16 and therefore reaches outer surface 10a of toroidal support 10, via feeding channels 17a, 17b, 17c.

Pressure exerted by the fluid causes tire 7, which has its side portions 8 sealingly sandwiched between toroidal support 10 and cheeks 4a, 4b, to expand at its radially outer portion 9 in the holding space defined between the walls of moulding cavity 6 and outer surface 10a of toroidal support 10. Thus, between the inner surface of tire 7 and outer surface 10a of toroidal support 10, a diffusion interspace 19 is created which is filled with fluid under pressure.

Pressurized-fluid admission may be provided to be preceded by a starting preforming step, aiming at causing an initial detachment of the inner surface of tire 7 from toroidal support 10 at its radially outer portion 9. This preforming step can be carried out by preliminary admission into moulding cavity 6 of a working fluid consisting of nitrogen for example, fed at a pressure included between 3 and 5 bar for example, and at all events lower than that of the fluid under pressure admitted during the pressing step.

Subsequently, admission of the pressurized fluid is carried out so as to fix the final expansion of radially outer portion 9 of tire 7, bringing said portion into thrust relationship against the inner walls of moulding cavity 6 defined by sectors 5a, 5b.

Simultaneously, the pressurized fluid is drawn out of the lower portion of moulding cavity 6 through one or more discharge shanks 20 connected to the lower portion itself close to inner circumferential edges 7b of tire 7.

Thus, along the inner surface of toroidal support 10 and in diffusion interspace 19, a stream of fluid under pressure moving from the upper to the lower portions of moulding cavity 6 is created, so that an efficient and homogeneous administration of heat to tire 7 is ensured.

In more detail, the pressurized fluid distributed from admission nozzles 15 runs along an upper section of guide duct 16 until it comes close to the first series of feeding channels 17a. Part of the pressurized fluid reaches diffusion interspace 19 through feeding channels 17a of the first series advantageously having an orientation in harmony with the flow direction of the fluid itself along guide duct 16. The remaining part of the pressurized fluid continues its motion via guide duct 16, along the inner surface of toroidal support 10 in the direction of the lower portion of moulding cavity 6. The fluid stream passing through feeding channels 17b, 17c belonging to the second and third series promotes removal of fluid under pressure from diffusion interspace 19, by Venturi effect.

Thus an efficient exchange of the fluid under pressure in diffusion interspace 19 is ensnared, which will bring about continuous removal of the condensate tending to be formed therein during the curing process.

In the pressing step, diffusion interspace 19 preferably has an extension included between 3 mm and 14 mm, measured between inner surface 7c of tire 7 and outer surface 10a of toroidal support 10, at least close to an equatorial plane of the tire coincident with equatorial plane X-X of moulding cavity 6.

It is also preferably provided that the amount of the expansion imposed to tire 7 should involve a stretching of the belt structure of same with an increase in the circumference thereof included between 1% and 3.5%, measured at equatorial plane X-X of the tire itself.

Advantageously, this expansion does not involve any abnormal tensioning of the cords forming the tire carcass structure, particularly at side portions 8 thereof, firmly held between cheeks 4a, 4b and toroidal support 10. Tensioning and consequent stretching of the carcass and belt cords is in fact concentrated a radially outer portion 9 of tire 7.

The pressurized fluid admitted to diffusion interspace 19 during the pressing step can consist of nitrogen or another inert gas, for example.

However, in one preferential embodiment, in addition to or in place of the inert gas, preferably overheated steam is provided to be employed, at a temperature preferably included between 170° C. and 210° C., fed at a gradually increasing pressure until a value included between 16 and 30 bar, preferably of about 18 bar. Under this circumstance the pressurized fluid sent to feeding channels 17a, 17b, 17c for tire moulding also partly or completely performs the function of heating fluid for transmitting the necessary heat to the tire for vulcanization of same.

Primary duct 13, admission nozzles 15, guide duct 16 and feeding channels 17a, 17b, 17c, together with further canalizations 22a, 22b, 21a, 21b close to cheeks 4a, 4b and to sectors 5a, 5b of mould 2 fed with steam under pressure at high temperature, also perform the function of heating devices for the walls of mould 2 in order to administer the necessary heat to tire 7, for molecular crosslinking of same even from the outside towards the inside.

In accordance with a further aspect of the invention, before admission of fluid under pressure, a treatment of the inner surface of tire 7 is preferably carried out to prevent steam under pressure, above all in the starting steps of the vulcanization cycle, from permeating through the green elastomer material of which the tire is made. In more detail, to this purpose the present method involves the arrangement of at least one thin prevulcanized layer (liner) of impermeable blend on the inner surface of the tire. Advantageously, the prevulcanized liner (not shown in the drawings) can be directly formed on toroidal support 10 during a step preceding manufacturing of tire 7 on the toroidal support itself, or applied in the form of a skin coat to outer surface 10a of toroidal support 10.

Further specifications as regards the liner's composition and features are described in the European patent application No. 98830696.5 in the name of the same Applicant, to which it is possible to refer for further explanations.

The invention achieves important advantages.

In fact, the possibility of manufacturing the tire directly on a rigid toroidal support ensures high features to the tire in terms of geometric precision and structural uniformity.

Employment of a rigid toroidal support during the moulding and curing step enables a perfect centering of the tire within the vulcanization mould to be achieved, and allows a greater control of the geometric and structural features of the tire itself during the expansion step as compared with traditional processes using inflatable vulcanization bladders. This geometric and structural control is also further improved by an efficient anchoring of side portions 8 between cheeks 4a, 4b and toroidal support 10, as previously described, without any risk of flash formation due to leakage of the elastomer material at the beads, not even during the initial steps of the moulding and curing process.

In addition, admission of steam under pressure and at a given temperature to the diffusion interspace formed between the toroidal support and the inner surface of the tire ensures a greater transmission of heat to the tire, which transmission is not hindered by bodies or elastomer material such as the vulcanization bladders of the known art, and is more efficient than that obtainable by contact with solid bodies such as the toroidal support itself.

Use of a toroidal support during the vulcanization step further offers the possibility of greatly reducing the volume taken up by steam within the tire so that vulcanization is achieved with greatly reduced steam amounts, as compared with the known art. A further reduction in the steam amount to be used is achieved due to the forced pressurized-fluid admission to the guide duct defined between filling structure 18 and the inner surface of toroidal support 10.

Admission of steam or another fluid under pressure between the toroidal support and the inner tire surface also enables appropriate pre-loading forces to be produced, through tire expansion, in the inner reinforcing structures of the tire itself, which condition is often sought for, in order to achieve given behavioural qualities.

In particular, advantageously the invention makes it possible to cause a stretching with consequent pre-loading forces in the belt structure of the tire, without imposing too much tensioning to the cords forming the ply or plies belonging to the carcass structure, above all at the sidewall regions.

It is to be noted that arrangement of a guided path for steam or another fluid under pressure along the inner surfaces of the toroidal support, as well as the particular orientation of feeding ducts 17a, 17b, 17c ensures an excellent steam exchange within diffusion interspace 19 and, consequently, an efficient removal of the water drops that are likely to be formed by condensation on the inner tire surfaces following heat transmission carried out by steam. This aspect is particularly advantageous because the presence of water drops on the inner surfaces of the tire would be dangerous for achievement of an efficient heat transmission.

Arrangement of a pre-cured elastomer layer on the inner surface of the tire also eliminates the risk that a direct contact of steam with the inner surfaces of the tire way cause diffusion of water particles in the layers of the green blend, above all during the initial steps of the vulcanization process.

Many modifications and variations may be made to the invention as described. For instance, diffusion interspace 19 may be provided to be at least partly defined by a surface lowering arranged on outer surface 10a of toroidal support 10. In this case too, due to admission of fluid under pressure, an expansion of tire 7 increasing the volume of diffusion interspace 19 is achieved.

The invention claimed is:

1. A method of moulding and curing tyres for vehicle wheels, comprising the steps of:

disposing a tyre being processed on a toroidal support, wherein an outer surface of the toroidal support substantially mates with an inner surface of the tyre;

enclosing the tyre and the toroidal support inside a moulding cavity defined in a vulcanization mould, the moulding cavity having walls, wherein a shape of the moulding cavity walls matches an outer surface of the tyre when vulcanization is completed;

pressing the outer surface of the tyre against the moulding cavity walls; and administering heat to the tyre to cause molecular crosslinking of the tyre;

wherein the pressing step comprises the steps of:

compressing side portions of the tyre between the moulding cavity walls and the outer surface of the toroidal support, concurrently with the enclosing step, wherein the side portions extend from inner circumferential edges of the tyre to transition regions between sidewalls, located at respective side portions, and a tread band disposed at a radially-outer portion of the tyre, delimited between the side portions; and expanding a radially-outer portion of the tyre to bring the radially-outer portion of the tyre against the walls of the moulding cavity, said radially-outer portion being delimited between the side portions, wherein said expanding step includes a step of admitting a fluid under pressure, and, before the expanding step, admitting a working fluid between the outer surface of the toroidal support and the inner surface of the tyre while the mould is closed, wherein the working fluid is under a lower pressure than that of the fluid under pressure admitted during the expanding step.

2. The method of claim 1, wherein the fluid under pressure is admitted to at least one diffusion interspace created between the outer surface of the toroidal support and the inner surface of the tyre.

3. The method of claim 2, wherein, before admission of the fluid under pressure, the inner surface of the tyre substantially adheres, over a whole extension of the inner surface of the tyre, to the outer surface of the toroidal support, and wherein the diffusion interspace is created during tyre expansion.

4. The method of claim 1, wherein admission of the fluid under pressure takes place through feeding channels formed in the toroidal support and opening onto the outer surface of the toroidal support.

5. The method of claim 2, wherein heat administration takes place by admission of a heating fluid to the diffusion interspace, and wherein the heating fluid comprises a same fluid under pressure as employed for carrying out the pressing step.

6. The method of claim 2, wherein the fluid under pressure is introduced into an upper portion of the moulding cavity and guided along an inner surface of the toroidal support towards a lower portion of the moulding cavity.

7. The method of claim 6, further comprising a step of drawing the fluid under pressure out of the lower portion of the moulding cavity, carried out concurrently with introducing the fluid under pressure, to create a pressurized fluid stream along the inner surface of the toroidal support and the diffusion interspace.

8. The method of claim 6, wherein a rotational movement around a geometric axis of the toroidal support is imparted to the fluid under pressure introduced into the moulding cavity.

9. The method of claim 2, wherein the diffusion interspace has an extension between 3 mm and 14 mm, measured between the inner surface of the tyre and the outer surface of the toroidal support, at least at an equatorial plane of the tyre.

10. The method of claim 1, wherein the expanding step involves an increase in the tyre circumference between 1% and 3.5%, measured at an equatorial plane of the tyre.

11. The method of claim 1, wherein the step of disposing the tyre on the toroidal support is carried out by directly manufacturing the tyre on the toroidal support.

12. The method of claim 2, wherein, before admission of the fluid under pressure, a treatment of the inner surface of the tyre is carried out to prevent permeation of the fluid under pressure through an elastomer material forming the tyre.

13. The method of claim 2, wherein a prevulcanized liner is directly formed on the toroidal support during a preliminary step to prevent permeation of the fluid under pressure through an elastomer material forming the tyre.

* * * * *